US012441593B1

(12) United States Patent
Deason

(10) Patent No.: US 12,441,593 B1
(45) Date of Patent: Oct. 14, 2025

(54) PORTABLE BATTERY POWERED JACK

(71) Applicant: Ernest D. Deason, Foristell, MO (US)

(72) Inventor: Ernest D. Deason, Foristell, MO (US)

( * ) Notice: Subject to any disclaimer, the term of this patent is extended or adjusted under 35 U.S.C. 154(b) by 0 days.

(21) Appl. No.: 18/947,394

(22) Filed: Nov. 14, 2024

Related U.S. Application Data

(60) Provisional application No. 63/598,794, filed on Nov. 14, 2023.

(51) Int. Cl.
*B66F 3/10* (2006.01)
*B66F 3/44* (2006.01)

(52) U.S. Cl.
CPC . *B66F 3/10* (2013.01); *B66F 3/44* (2013.01)

(58) Field of Classification Search
CPC ...... B66F 3/08; B66F 3/10; B66F 3/44; B66F 5/025; B66F 2700/04
See application file for complete search history.

(56) References Cited

U.S. PATENT DOCUMENTS 2,715,341 A * 8/1955 Hogan ...................... G05G 5/04 74/89.37
3,850,409 A 11/1974 Jones et al.
6,145,813 A 11/2000 Anderson
9,446,743 B2 9/2016 Madison
11,584,624 B1 2/2023 Christensen
11,608,037 B1 3/2023 Swanson
2016/0038240 A1 2/2016 Guerrero

FOREIGN PATENT DOCUMENTS

AU 1628392 A * 11/1992

* cited by examiner

*Primary Examiner* — C. A. Rivera
(74) *Attorney, Agent, or Firm* — Grace J. Fishel

(57) ABSTRACT

A screw jack with a lead screw that disengages from a traveling nut to prevent overdrive directly coupled to an electric motor though a series of planetary gears. A battery adapter mounted on an outer tube of the jack for attachment of a user's selected battery to the motor. A lift accessory with two lifting points, one a hook and the other a channel, bolted to a support bracket attached to an outer tube of the jack. A hanging accessory with toggle clamps at opposite ends of a beam for suspending the jack such as from a roll cage of an ATV.

20 Claims, 7 Drawing Sheets

PORTABLE BATTERY POWERED JACK

BACKGROUND OF THE INVENTION

Field of the Invention

A battery powered screw jack with a traveling nut that disengages from a lead screw to prevent overdrive and possible damage to the lead screw and with a planetary gear set directly coupled to a motor drive shaft.

Brief Description of the Prior Art

Currently there are no jacks on the market that are battery operated, portable and powerful. A problem with existing jacks that are powerful is that they are big, heavy and hard to bring along. Those that are powered and lighter do not have enough lifting capacity and those that are not powered are hard to use. When an off-road accident occurs what is needed is a powered jack that is both portable and is capable of lifting a heavy load.

BRIEF SUMMARY OF THE INVENTION

In view of the above, it is an object of the present invention to provide a powerful, portable, battery powered screw jack having the following features:

A screw jack in accordance with the present invention includes the following elements: an outer tube; a middle tube concentrically received in the outer tube; an inner tube concentrically received in the middle tube; a lead screw received in the middle tube; and, a traveling nut affixed to a top of the middle tube threadedly engaged with the lead screw. The outer tube and middle tube have a cooperative dimple and groove structure to prevent the middle tube from rotating relative to the outer tube. In like manner, the middle tube and inner tube have a cooperative dimple and groove structure to prevent the inner tube from rotating relative to the middle tube. An important aspect is that the lead screw has a collar with a diameter larger than the lead screw at an upper end of the lead screw with a first unthreaded portion adjacent to the collar and with a first spring positioned over the first unthreaded portion between the collar and a threaded portion of the lead screw; the lead screw further has a stop with a diameter larger than the lead screw at an lower end with a second unthreaded portion adjacent to the stop and with a second spring positioned over the second unthreaded portion between the stop and a threaded portion of the lead screw.

In an embodiment of the jack, a drive assembly is connected to the lead screw with the drive assembly made up of an electric motor and a planetary gear assembly in a housing concentrically mounted over a top of the outer tube. In yet another case, the planetary gear assembly is directly coupled to a motor drive shaft with a central gear engaging one or more individual planetary gear sets operably installed in series and with a last or lower planetary gear set in the series driving the lead screw. In some implementations, the unthreaded portions are formed by deforming the lead screw.

In another aspect of the invention a battery adapter is attached to the outer tube with the battery adapter configured for electrical attachment of a user's selected battery for powering the motor. In still yet other cases, a foot is attached to the inner tube with the inner tube having a series of holes along its length for adjustably positioning the inner tube in the middle tube with a pin inserted through aligned holes in the middle tube and selected aligned holes in the inner tube. The foot, for example, is a heavy-duty off road plate.

In some applications, the foot has a pair of ears with a first set of mounting holes configured to accommodate a cross bolt for pivotal mounting the foot on a tab attached to the inner tube. In other applications a second set of mounting holes are provided below the first set for use with a pin to allow the foot to pivot up aligned with the outer tube for compact carrying.

In a preferred embodiment the jack has a lifting capacity of 3500 pounds and a support bracket is attached to the outer tube. The support bracket can be used for lifting and for attaching a lift accessory with two lifting points. In an embodiment of the jack, the lift accessory includes a plate from which a hook and a channel depend and a tubular sleeve on which the hook and channel are supported on struts.

In still yet other embodiments a hanging accessory is provided to hang the jack on a horizontal frame such as a roll cage of an ATV. In some embodiments the hanging accessory is a beam with toggle clamps at opposite ends attached to the outside tube with spaced apart U-bolts secured with nuts.

BRIEF DESCRIPTION OF THE SEVERAL VIEWS OF THE DRAWINGS

In the accompanying drawings, in which one of various possible embodiments of the invention is illustrated, corresponding reference characters refer to corresponding parts throughout the several views of the drawings in which.

DETAILED DESCRIPTION OF AT LEAST ONE PREFERRED EMBODIMENT OF THE INVENTION

Figure 9:
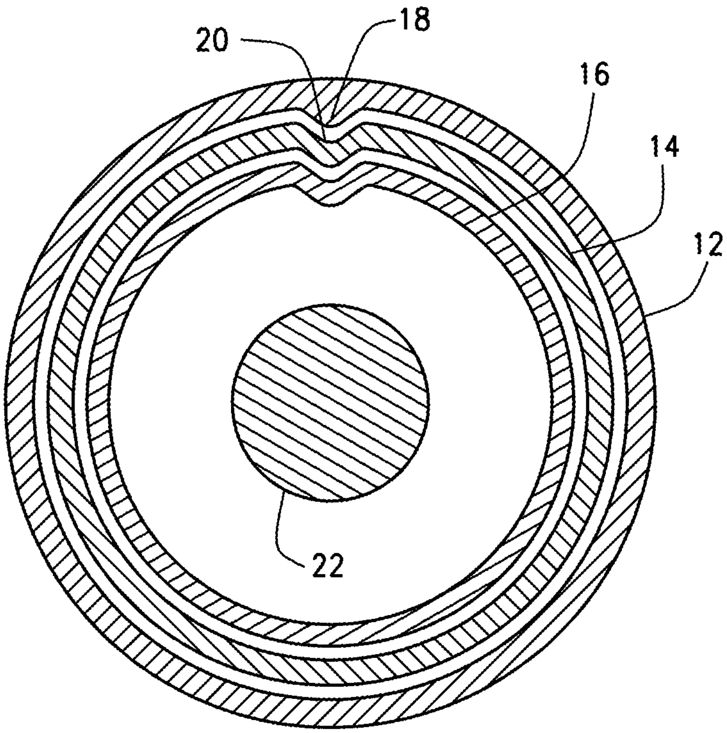
FIG. 9 is a cross section take along the plane of 9-9 in FIG. 4; and, FIG. 10 is side elevation of a lift accessory.

Referring to the drawings more particularly by reference character a screw jack 10 in accordance with the present invention includes an outer tube 12 with a middle tube 14 concentrically received in the outer tube and with an inner tube 16 is concentrically received in the middle tube 14. Outer, middle and inner tube are are coaxially aligned with sufficient separation for relative longitudinal movement. As shown in FIG. 9, there is dimple 18 in outer tube 12 which is cooperatively received in a groove 20 in middle tube 14 to prevent the middle tube from rotating relative to outer tube 12. In like manner, groove 20 in middle tube 14 serves as a dimple which is received in a groove in inner tube 16.

A lead screw 22 is positioned in middle tube 14 with a traveling nut 24 affixed to a top of the middle tube threadably engaged with lead screw 22. A drive assembly 26 is connected to lead screw 22 which when rotated causes traveling nut 24 to move longitudinally on lead screw 22 and middle tube 14 to project from or retract back into outer tube 12 depending on the direction that lead screw 22 is rotated by a drive assembly 26.

Figure 4:
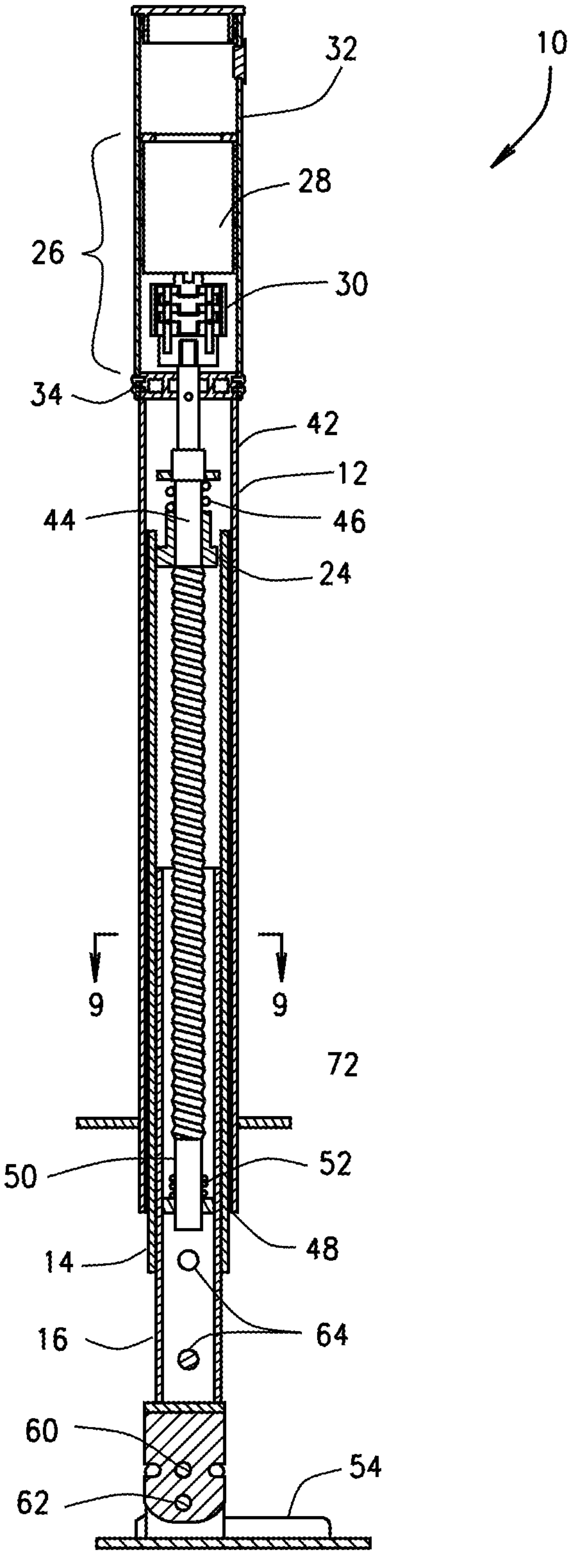
FIG. 4 is a longitudinal cross-section thereof.
Figure 5:
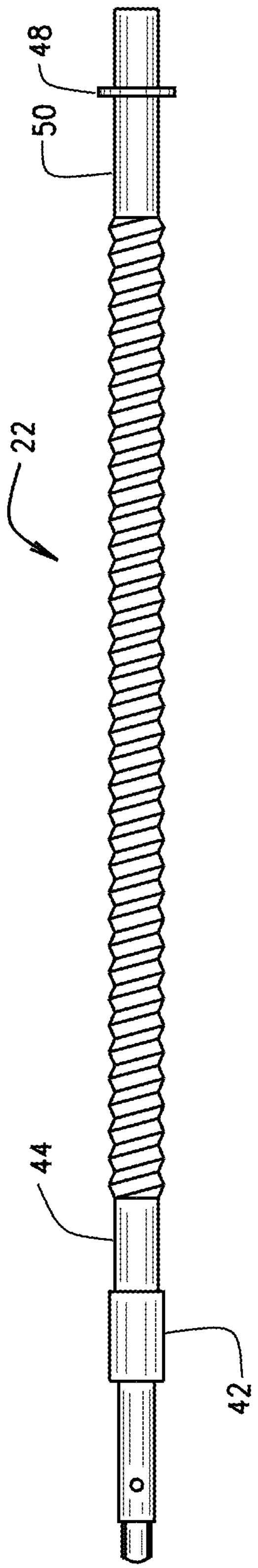
FIG. 5 is a side elevation of a lead screw.
Figure 6:
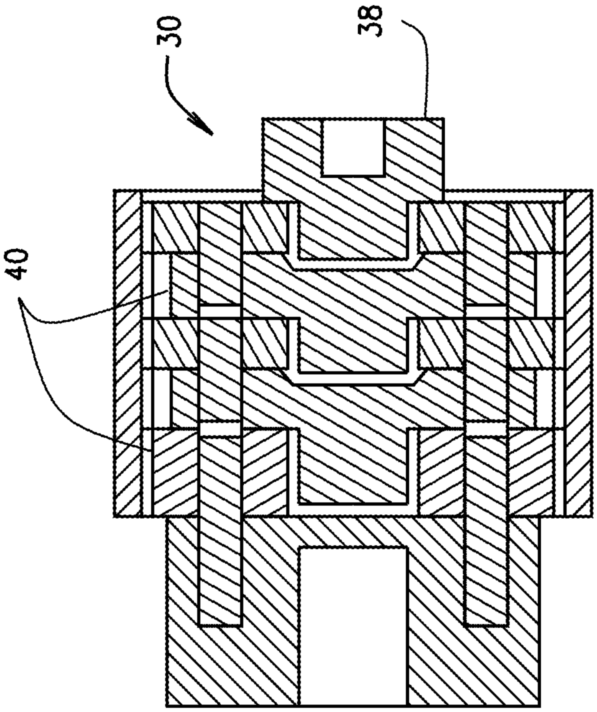
FIG. 6 is a cross-section of a planetary gear assembly.
Figure 7:
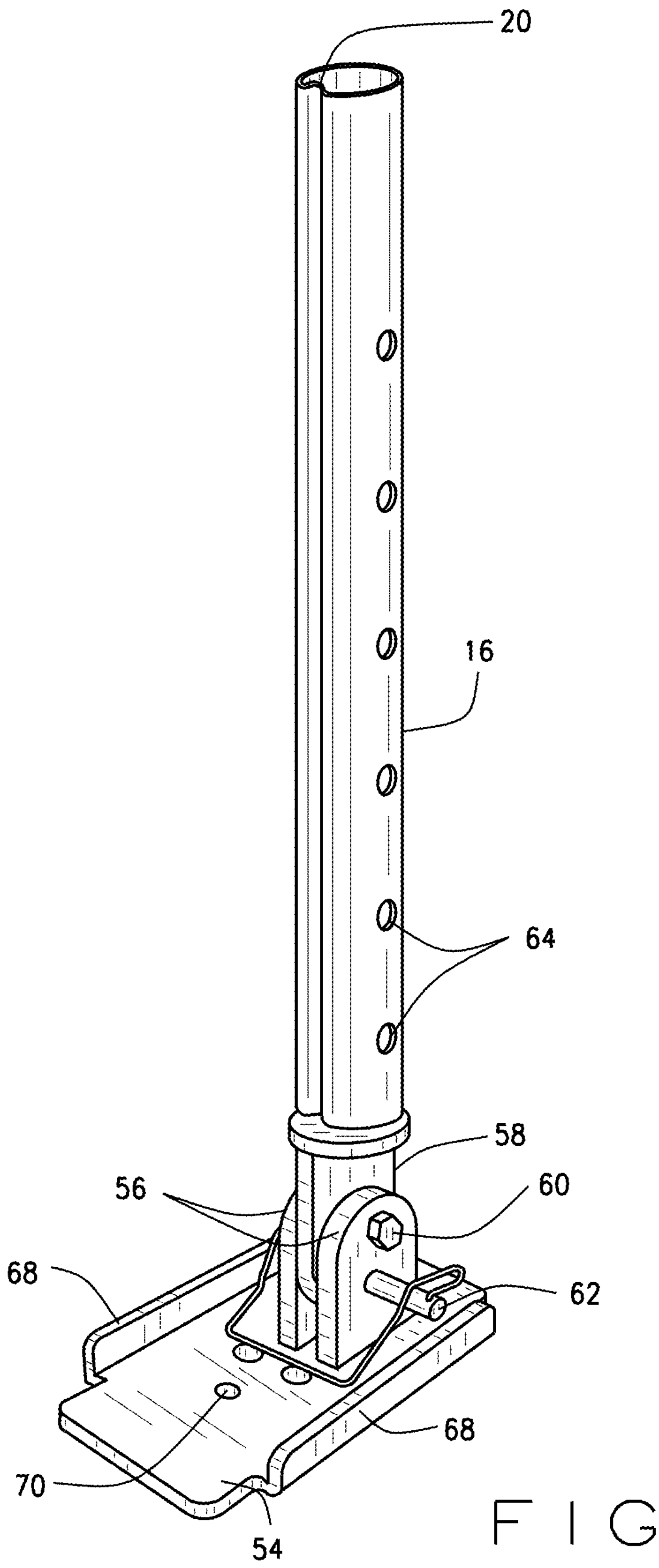
FIG. 7 is a perspective view of an adjustable in length inner tube with a foot attached.

As shown in FIG. 4, drive assembly 26 includes an electric motor 28 and a planetary gear assembly 30 in a housing 32. Housing 32 is concentrically received over a top of outer tube 12 and affixed with bolts 34. A battery adapter for a battery 36 is attached to outer tube 12 to facilitate connection of electric motor 28 to a battery of the user's choice. Different battery adapters are provided for batteries such as those sold by Milwaukee, DeWalt, Makita, Rigid and so forth. Turning to FIG. 6, planetary gear assembly 30 has a central gear 38 directly coupled to the motor drive shaft with no gear transfer. Central gear 38 engages a plurality of individual planetary gear sets 40 operably installed in series with a last or lower planetary gear set driving lead screw 22. In the case of electrical failure during use, a manual override may be provided. In which case, motor may be disconnected and a wrench used to operate planetary gear assembly 30.

With continuing reference to FIG. 4, lead screw 22 has a collar 42 with a diameter larger than lead screw positioned its upper end with an unthreaded portion 44 of the lead screw leading to the collar. A spring 46 is positioned around unthreaded portion 44. In a similar manner, lead screw 22 has a stop 48 with a diameter larger than lead screw 22 at its lower end. Stop 48 is positioned at the end of an unthreaded portion 50 with a spring 52 positioned over unthreaded portion 50. Collar 42 may be an integral portion of lead screw 22 while stop 48 may be welded to lead screw 22. The purpose of unthreaded portions 44, 50 is to eliminate or reduce the risk of overdriving the lead screw 22 as more particularly described below.

Unthreaded portion 44, 50 may comprises a deformed portion of lead screw 22 by crimping, compressing or otherwise deforming the area such that traveling nut 24 is released from lead screw 22 when the traveling nut reaches the top or bottom of lead screw 22. This occurs when middle tube is fully retracted as shown in FIG. 4 or when extended. Continued application of a torque by drive assembly 26 will only result in rotation of lead screw 22 with no conversion to forward or backward movement of traveling nut 24. Thus disengagement of traveling nut 24 can prevent overdrive and possible damage to lead screw 22 or other components of jack 10.

Reengagement of traveling nut 24 with the threads of lead screw 22 would be problematic without springs 46, 52 which keep traveling nut 24 in contact with the rotating lead screw 22 in the unthreaded areas such that when rotation of lead screw 22 is reversed traveling nut 24 reengages lead screw 22 (i.e., the threads on the lead screw can re-engage with the threads on the traveling nut). Once the threads are engaged rotation of lead screw 22 results in linear movement of traveling nut 24 resulting in extension or retraction of middle tube 14 and lengthening or shortening of jack 10.

A foot 54 is attached to inner tube 16 with a pair of opposed ears 56 between which a tab 58 attached to inner tube 16 is received. Ears 56 and tab 58 are provided with holes configured to accommodate a cross bolt 60 by which foot 54 is pivoted on inner tube 16. A second set of holes are provided below the pivot through which removable pin 62 is received. Pin 62 locks foot 54 perpendicular to the longitudinal axis of jack 10 but when removed allows foot 54 is rotate flat against inner tube 16 for travel or storage.

Inner tube 16 has a plurality of spaced apart aligned holes 64 by means of which inner tube 16 may be extended or retracted with respect to middle tube 16 thereby provided a second method for lengthening or shortening the overall length of jack 10. For this purpose, a pin 65 passes through aligned holes in middle tube 114 and selected holes in inner tube 16. Pin 65 also facilitates removal of inner tube 16 from the jack assembly for use of foot 54 as a shovel.

Figure 8:
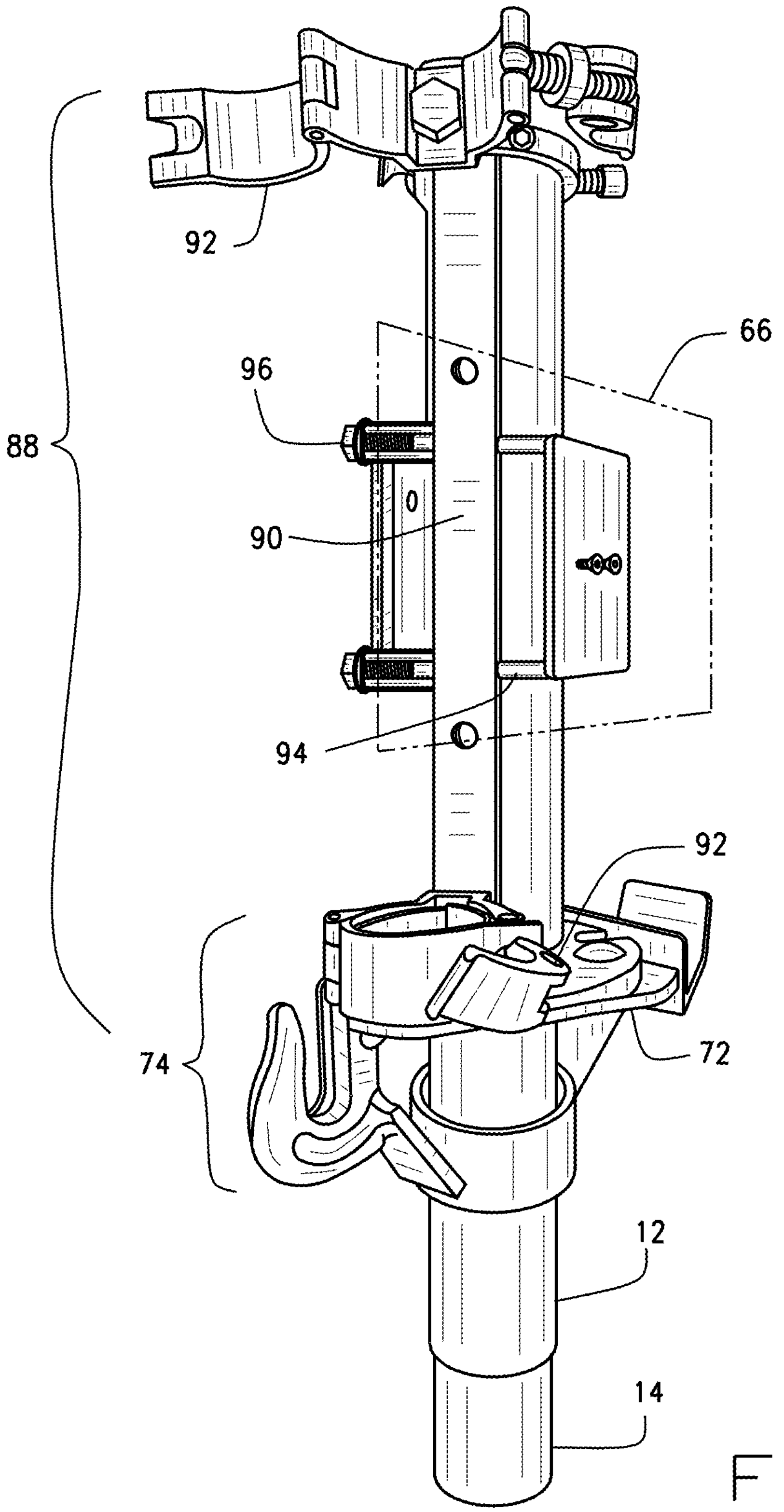
FIG. 8 is a perspective view of an outer tube showing a hanging accessory and lift accessory.

When foot 54 is in contact with loose dirt, sand, mud or the like, a shoe 66 as shown schematically in FIG. 8 may be attached to the bottom of foot 54 to increase the surface area under the foot to help prevent slippage, sinking or other unwanted movement of foot 54 and thus jack 10 during use, or as jack is put under load. Foot 54 for this purpose has short upright side walls 68 and apertures 70 for attachment of shoe 66 providing a heavy-duty off road plate.

Figure 1:
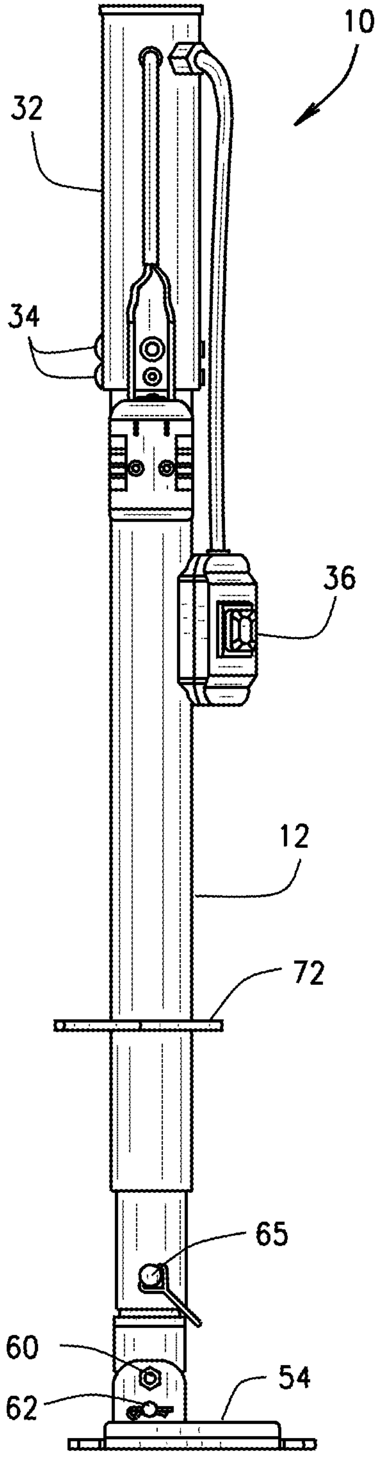
FIG. 1 is a right side view of a screw jack in accordance with the present invention.
Figure 2:
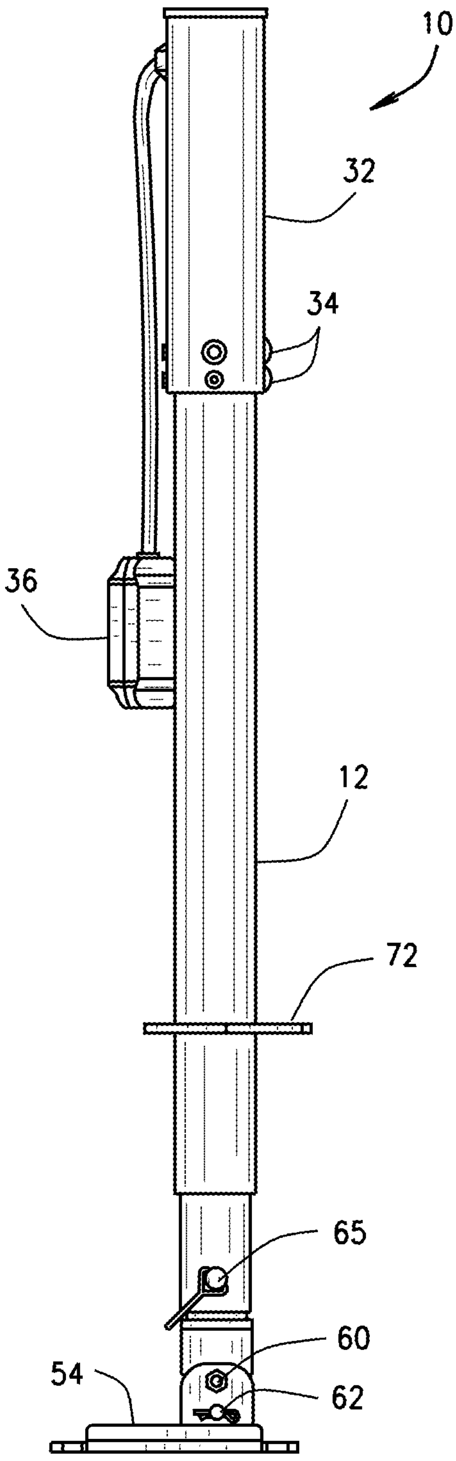
FIG. 2 is a left side view thereof.
Figure 3:
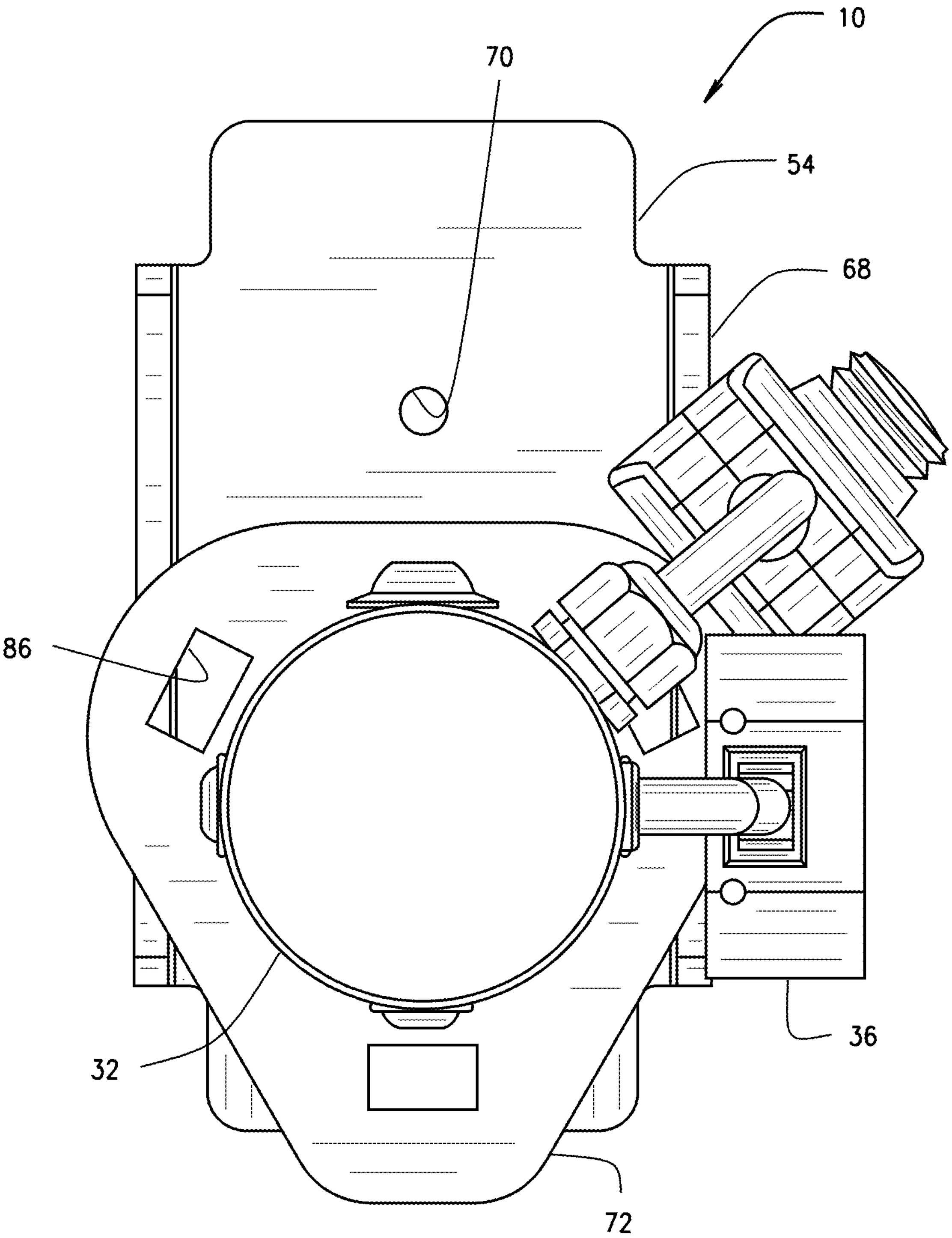
FIG. 3 is a top view thereof.
Figure 10:
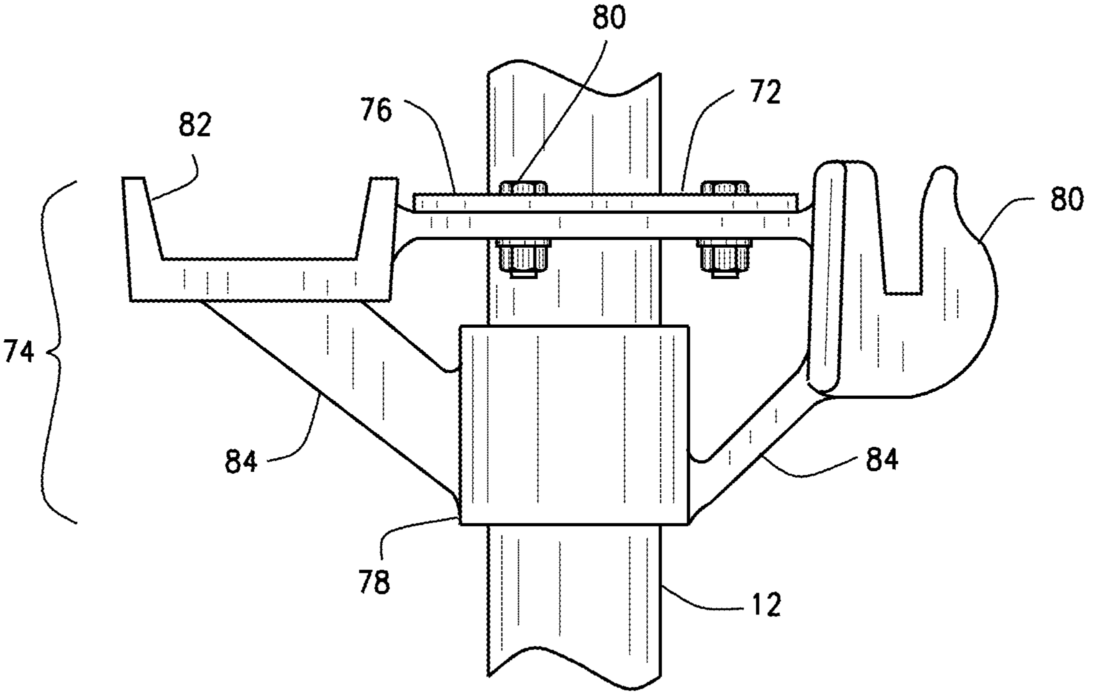

As seen in FIGS. 1 and 2, a support bracket 72 is attached, welded or the like, to an outer surface of outer tube 12. Support bracket 70 may be triangular in shape as shown in FIG. 3, circular or have some other shape and may be used in ordinary manner to lift a tongue on a trailer or the like. For use with jack 10 support bracket 72 provides a point of attachment for a lift accessory 74 having two lifting points as best seen in FIGS. 8 and 10. As shown, lift accessory 74 includes a plate 76 and an open ended tubular sleeve 78 adapted to be movable and slidably positioned on outer tube 12. A hook 80 with a deep curve and a channel 82 with a flat bottom depend from plate 76 transverse of each other. A first strut 84 connects an underside of hook 80 to tubular sleeve 78 and a second strut 84 connects an underside of channel 82 to tubular sleeve 78. Support bracket 72 has spaced apart apertures 86 by means of which lift accessory 74 may be bolted to support bracket 72 with either hook 80 or channel 82 facing in a direction most suitable for an item to be lifted.

Jack 10 is particularly useful for off-road use. To facilitate carriage of the jack on an ATV or other sports vehicle, a hanging accessory 88 for supporting the jack from a roll cage or the like is provided. Hanging assembly 88 consists of a beam 90 with first and second toggle clamps 92 at opposite ends for suspending the jack from the roll cage. Beam 90 is mounted on first and second spaced apart U-shaped bolts 94 to which beam is welded or otherwise attached. A keeper is provided between the threaded ends of U-shaped bolts 94 for attaching hanging assembly 88 to outer tube 12 by tightening nuts 96 on the U-shaped bolts as seen in FIG. 8.

In use jack 10 may be conveniently carried to the field attached to a roll cage of an ATV or other vehicle with hanging accessory 88. When a jack is needed, jack 10 may be detached from the roll cage and battery 36 slipped into the battery adapter. Jack 20 may then be positioned with hook 80 or channel 82 placed under the frame to be lifted. With an 18V battery, jack 10 is capable of providing 3500 pounds of lifting force. If the distance that extension of middle tube 14 is insufficient for the needed lift, inner tube 16 may be extended using spaced apart holes 64. As will readily occur to a user in need of a heavy lifting force, jack 10 may be used for other lifting operations for example, pulling a t-post, lifting a tractor to change a tire, straightening a bent metal object and so forth.

In view of the above, it will be seen that the object of the invention is achieved and other advantageous results attained. As various changes could be made in the above constructions without departing from the scope of the invention, it is intended that all matter contained in the above description or shown in the accompanying drawings shall be interpreted as illustrative and not in a limiting sense.

What is claimed:

1. A jack comprising:

an outer tube;

a middle tube concentrically received in the outer tube;
an inner tube concentrically received in the middle tube;
a lead screw received in the middle tube;
a traveling nut affixed to a top of the middle tube threadedly engaged with the lead screw;
said outer tube and middle tube having a cooperative dimple and groove structure to prevent the middle tube from rotating relative to the outer tube;
said middle tube and inner tube having a cooperative dimple and groove structure to prevent the inner tube from rotating relative to the middle tube;
said lead screw having a collar with a diameter larger than a threaded portion of the lead screw at an upper end of the lead screw with a first unthreaded portion adjacent to the collar and with a first spring positioned over the first unthreaded portion between the collar and a the threaded portion of the lead screw;
said lead screw having a stop with a diameter larger than the threaded portion of the lead screw at an lower end with a second unthreaded portion adjacent to the stop and with a second spring positioned over the second unthreaded portion between the stop and a the threaded portion of the lead screw.

2. The jack of claim 1 wherein a drive assembly is connected to the lead screw, said drive assembly comprising an electric motor and a planetary gear assembly in a housing concentrically mounted over a top of the outer tube.

3. The jack of claim 2 wherein the planetary gear assembly is directly coupled to a motor drive shaft, a central gear engaging one or more individual planetary gear sets operably installed in series, with a last or lower planetary gear set in the series driving the lead screw.

4. The jack of claim 1 wherein the first and second unthreaded portions are formed by deforming the lead screw.

5. The jack of claim 2 wherein a battery adapter is attached to the outer tube, said battery adapter configured for electrical attachment of a user's selected battery to the battery adapter.

6. The jack of claim 1 wherein a foot is attached to the inner tube, said inner tube having a series of holes along its length for adjustably positioning the inner tube in the middle tube with a pin inserted through aligned holes in the middle tube and selected aligned holes in the inner tube.

7. The jack of claim 6 wherein a shoe is positioned on the foot, said shoe being a heavy-duty off road plate.

8. The jack of claim 6 wherein the foot has a pair of ears with a first set of mounting holes configured to accommodate a cross bolt for pivotal mounting the foot on a tab attached to the inner tube.

9. The jack of claim 7 wherein a second set of mounting holes are provided below the first set for use with a pin to allow the foot to pivot up aligned with the outer tube for compact carrying.

10. A jack comprising:
an outer tube;
a middle tube concentrically received in the outer tube;
an inner tube concentrically received in the middle tube;
a lead screw received in the middle tube;
a traveling nut affixed to a top of the middle tube threadedly engaged with the lead screw;
said lead screw directly coupled to a motor through a planetary gear assembly;
said outer tube and middle tube having a cooperative dimple and groove structure to prevent the middle tube from rotating relative to the outer tube;
said middle tube and inner tube having a cooperative dimple and groove structure to prevent the inner tube from rotating relative to the middle tube;
said lead screw having a collar with a diameter larger than a threaded portion of the lead screw at an upper end of the lead screw with a first unthreaded portion adjacent to the collar and with a first spring positioned over the first unthreaded portion between the collar and a the threaded portion of the lead screw;
said lead screw having a stop with a diameter larger than the threaded portion of the lead screw at an lower end with a second unthreaded portion adjacent to the stop and with a second spring positioned over the second unthreaded portion between the stop and a the threaded portion of the lead screw; and,
a support bracket attached to the outer tube.

11. The jack of claim 10 having a lift accessory for attachment to the support bracket, said lift accessory having two lifting points.

12. The jack of claim 11 wherein the lift accessory includes a plate from which a hook and a channel depend and a tubular sleeve on which the hook and channel are supported on struts.

13. The jack of claim 10 having a hanging accessory on the outside tube.

14. The jack of claim 13 wherein the hanging accessory comprises a beam with toggle clamps at opposite ends, said beam attached to the outside tube with spaced apart U-bolts secured with nuts.

15. The jack of claim 10 wherein a battery adapter is attached to the outer tube, said battery adapter configured for electrical attachment of a user's selected battery, said selected battery attached to the motor.

16. The jack of claim 10 wherein a foot is attached to the inner tube, said inner tube having a series of holes along its length for adjustably positioning the inner tube in the middle tube with a pin inserted through aligned holes in the middle tube and selected aligned holes in the inner tube.

17. The jack of claim 16 wherein a shoe is positioned on the foot, said shoe being a heavy-duty off road plate.

18. The jack of claim 16 wherein the foot has a pair of ears with a first set of mounting holes configured to accommodate a cross bolt for pivotal mounting the foot on a tab attached to the inner tube.

19. The jack of claim 18 wherein a second set of mounting holes are provided below the first set for use with a pin to allow the foot to pivot up aligned with the outer tube for compact carrying.

20. The jack of claim 15 wherein the selected battery is 18V and jack has a lifting capacity of 3500 pounds.

* * * * *